(12) United States Patent
Kasahara et al.

(10) Patent No.: US 9,303,141 B2
(45) Date of Patent: Apr. 5, 2016

(54) FLUORINE-CONTAINING COPOLYMER COMPOSITION AND METHOD FOR PRODUCING SAME

(71) Applicant: ASAHI GLASS COMPANY, LIMITED, Chiyoda-ku (JP)

(72) Inventors: Kiyoshi Kasahara, Tokyo (JP); Yuji Hara, Tokyo (JP)

(73) Assignee: ASAHI GLASS COMPANY, LIMITED, Chiyoda-ku (JP)

(*) Notice: Subject to any disclaimer, the term of this patent is extended or adjusted under 35 U.S.C. 154(b) by 0 days.

(21) Appl. No.: 14/093,919

(22) Filed: Dec. 2, 2013

(65) Prior Publication Data

US 2014/0088248 A1 Mar. 27, 2014

Related U.S. Application Data

(63) Continuation of application No. PCT/JP2012/063811, filed on May 29, 2012.

(30) Foreign Application Priority Data

May 30, 2011 (JP) ................................ 2011-120523

(51) Int. Cl.
| | | |
|---|---|---|
| C08K 3/26 | (2006.01) | |
| C08K 5/05 | (2006.01) | |
| C08F 214/18 | (2006.01) | |
| C09D 127/12 | (2006.01) | |
| C08F 14/18 | (2006.01) | |
| C08F 214/24 | (2006.01) | |
| C08K 5/01 | (2006.01) | |

(52) U.S. Cl.
CPC . *C08K 5/05* (2013.01); *C08F 14/18* (2013.01); *C08F 214/18* (2013.01); *C08F 214/186* (2013.01); *C08F 214/24* (2013.01); *C08F 214/245* (2013.01); *C08K 3/26* (2013.01); *C09D 127/12* (2013.01); *C08K 5/01* (2013.01)

(58) Field of Classification Search
CPC ... C09D 127/12; C08F 14/18; C08F 214/186; C08F 2/06; C08K 3/262; C08L 27/12
USPC .......................................................... 524/544
See application file for complete search history.

(56) References Cited

U.S. PATENT DOCUMENTS

| | | | | |
|---|---|---|---|---|
| 7,919,557 B2* | 4/2011 | Sumi et al. | ..................... | 524/544 |
| 8,461,251 B2* | 6/2013 | Hara et al. | ..................... | 524/544 |
| 2009/0239993 A1* | 9/2009 | Sumi et al. | ..................... | 524/544 |
| 2011/0275753 A1* | 11/2011 | Hara et al. | ..................... | 524/544 |
| 2014/0088248 A1* | 3/2014 | Kasahara et al. | ............. | 524/768 |

FOREIGN PATENT DOCUMENTS

| | | |
|---|---|---|
| CA | 2 749 779 A1 | 8/2010 |
| EP | 2 399 941 | 12/2011 |
| JP | 61-174210 | 8/1986 |
| JP | 4-372612 | 12/1992 |
| JP | 6-263810 | 9/1994 |
| WO | 2010/095722 | 8/2010 |
| WO | WO 2010/095722 * | 8/2010 |

OTHER PUBLICATIONS

Extended European Search Report issued Oct. 16, 2014 in Patent Application No. 12792611.1.
International Search Report issued Aug. 28, 2012 in PCT/JP2012/063811.

* cited by examiner

*Primary Examiner* — Michael A Salvitti
(74) *Attorney, Agent, or Firm* — Oblon, McClelland, Maier & Neustadt, L.L.P.

(57) ABSTRACT

The present invention relates to a fluorine-containing copolymer composition comprising: (A) a fluorine-containing copolymer having a repeating unit based on fluoroolefin and a repeating unit based on a monomer having no fluorine atom; potassium carbonate; and an organic solvent, in which an amount of potassium carbonate contained is from 5 ppm to 80 ppm, on the $K_2O$ basis, based on the fluorine-containing copolymer (A).

17 Claims, No Drawings

FLUORINE-CONTAINING COPOLYMER COMPOSITION AND METHOD FOR PRODUCING SAME

This application is a continuation application of PCT/JP2012/063811 filed May 29, 2012 and claims the benefit of JP 2011-120523 filed May 30, 2011.

TECHNICAL FIELD

The present invention relates to a fluorine-containing copolymer composition and a method for producing the same.

BACKGROUND OF THE INVENTION

Fluorine-containing polymer compositions are suitably used as pint resins. Paint resins are required to have good storage stability under the state of solution. In addition, it is desirable that the resin solution is colorless and clear.

The patent reference 1 relates to a method for producing a fluorine-containing copolymer and describes that smooth progress of the copolymerization reaction and storage stability of varnish containing the formed copolymer are achieved by subjecting a monomer mixture containing a fluoroolefin and an alkyl vinyl ether to copolymerization in a polymerization medium containing a lower alkylbenzene and a component having a boiling point lower than the lower alkylbenzene in the presence of an alkali metal carbonate. Potassium carbonate is mentioned as an example of the alkali metal carbonate.

RELATED ART REFERENCES

Patent References

Patent Reference 1: JP-A-61-174210

SUMMARY OF THE INVENTION

Problems to be Solved by the Invention

However, though the storage stability is improved by the presence of potassium carbonate, there is a case in that haze (turbidness and cloudiness of coating film) becomes large in preparing a coating film.

When haze is large in the case of a clear paint for forming a transparent coating film, it causes a critical problem in that appearance of the coating film is spoiled. In addition, even in the case of preparing a colored paint by adding a pigment and the like to a paint composition, there will be a case of causing a problem such as a change in color tone.

The present invention has been made by taking the aforementioned circumstances into consideration, and it provides a fluorine-containing copolymer composition that has good storage stability and suppresses haze when made into a coat film and a method for producing the same.

Means for Solving the Problems

With the aim of solving the above-mentioned problems, the present inventors have conducted intensive studies and found as a result that when potassium carbonate is contained in a fluorine-containing polymer composition in an amount of from 5 ppm to 80 ppm, on the $K_2O$ basis, based on a fluorine-containing copolymer, the fluorine-containing copolymer composition that has good storage stability and in which haze is suppressed can be realized, thus resulting in the accomplishment of the present invention.

That is, the present invention is as follows:

(1) A fluorine-containing copolymer composition comprising:
  (A) a fluorine-containing copolymer having a repeating unit based on fluoroolefin and a repeating unit based on a monomer having no fluorine atom;
  potassium carbonate; and
  an organic solvent,
  wherein an amount of potassium carbonate contained is from 5 ppm to 80 ppm, on the $K_2O$ basis, based on the fluorine-containing copolymer (A).

(2) The fluorine-containing copolymer composition according to the above (1), wherein at least a part of the monomer having no fluorine atom is a monomer having a crosslinkable group.

(3) The fluorine-containing copolymer composition according to the above (2), wherein the repeating unit based on fluoroolefin is from 30% by mol to 70% by mol, a repeating unit based on the monomer having a crosslinkable group is from 5% by mol to 40% by mol, and a repeating unit based on a monomer having no fluorine atom and no crosslinkable group is from 0 to 45% by mol, of all the repeating units in the fluorine-containing copolymer (A).

(4) The fluorine-containing copolymer composition according to any one of the above (1) to (3), wherein mass ratio (fluorine-containing copolymer (A)/organic solvent) of the fluorine-containing copolymer (A) and the organic solvent is from 1/9 to 9/1.

(5) A method for producing a fluorine-containing copolymer composition, comprising the following polymerization step, potassium carbonate precipitation step, and potassium carbonate lowering step.

Polymerization step: a step of subjecting a monomer mixture comprising a fluoroolefin and a monomer having no fluorine atom to copolymerization, in the presence of a radical polymerization initiator, potassium carbonate, and a polymerization solvent containing an alcohol solvent having from 1 to 6 carbon atoms and a solvent other than the alcohol solvent having from 1 to 6 carbon atoms, under a condition that at least a part of the potassium carbonate is dissolved in the polymerization solvent, to obtain a solution of a fluorine-containing copolymer (A).

Potassium carbonate precipitation step: a step of removing the alcohol solvent having from 1 to 6 carbon atoms from the solution of the fluorine-containing copolymer (A) and lowering an amount of said alcohol solvent having from 1 to 6 carbon atoms to a level of from 0% by mass to 0.03% by mass based on the polymerization solvent, to precipitate the potassium carbonate in the solution.

Potassium carbonate lowering step: a step of filtering the solution of the fluorine-containing copolymer (A) obtained by the potassium carbonate precipitation step to remove undissolved potassium carbonate and lowering an amount of the potassium carbonate contained in the solution to a level of from 5 ppm to 80 ppm, on the $K_2O$ basis, based on the fluorine-containing copolymer (A).

(6) The method for producing a fluorine-containing copolymer composition according to the above (5), wherein mass ratio (potassium carbonate/total monomers in the monomer mixture) of the potassium carbonate and total monomers in the monomer mixture in the polymerization step is from 0.005/1 to 0.013/1.

(7) The method for producing a fluorine-containing copolymer composition according to the above (5) or (6), wherein an amount of the alcohol solvent having from 1 to 6 carbon atoms contained in the polymerization step is from 10% by mass to 95% by mass based on the polymerization solvent.
(8) The method for producing a fluorine-containing copolymer composition according to any one of the above (5) to (7), wherein the solvent other than the alcohol solvent having from 1 to 6 carbon atoms contains ethylbenzene and, as needed, xylene, and the mass ratio (ethylbenzene/xylene) of ethylbenzene and xylene in the polymerization solvent is from 10/90 to 100/0.

Advantageous Effects of the Invention

According to the present invention, a fluorine-containing copolymer composition that has good storage stability and in which haze is suppressed, and method for producing the same can be provided.

MODE FOR CARRYING OUT THE INVENTION

<Fluorine-Containing Copolymer Composition>

The fluorine-containing copolymer composition of the present invention is a composition containing a fluorine-containing copolymer (A) having a repeating unit based on fluoroolefin and a repeating unit based on a monomer having no fluorine atom (to be referred to as "fluorine-containing copolymer (A)" hereinafter), potassium carbonate, and an organic solvent, in which an amount of potassium carbonate contained is from 5 ppm to 80 ppm, on the $K_2O$ basis, based on the fluorine-containing copolymer (A).

According to the present invention, since the amount of potassium carbonate contained is from 5 ppm to 80 ppm, on the $K_2O$ basis, based on the fluorine-containing copolymer (A), a fluorine-containing copolymer composition that has good storage stability and in which haze is suppressed when made into a coat film is realized.

According to the present invention, the "amount of potassium carbonate contained is from 5 ppm to 80 ppm, on the $K_2O$ basis, based on the fluorine-containing copolymer (A)" is an index of potassium carbonate concentration based on the fluorine-containing copolymer (A) in the fluorine-containing copolymer composition, and this can be measured by atomic absorption analysis. In addition, the potassium carbonate concentration on the $K_2O$ basis includes not only the dissolved potassium carbonate ($K_2CO_3$) but also the potassium carbonate and potassium salt dispersed (including floating or precipitating one) in the fluorine-containing copolymer composition.

In this connection, the potassium salt is, illustratively for example, potassium chloride derived from a fluoroolefin component, which is formed in some cases during polymerization when chlorine-containing fluoroolefin is used as fluoroolefin, and the like.

The amount of potassium carbonate contained in the fluorine-containing copolymer composition of the present invention is from 5 ppm to 80 ppm, preferably from 8 ppm to 65 ppm, and further preferably from 10 ppm to 55 ppm, on the $K_2O$ basis, based on the fluorine-containing copolymer (A). Storage stability of the fluorine-containing copolymer composition becomes good at the lower limit value or more. In addition, at the upper limit value or less, a composition which forms a clear coating film without generating haze when made into coating film can be realized.

The method for achieving "the amount of potassium carbonate contained is from 5 ppm to 80 ppm, on the $K_2O$ basis, based on the fluorine-containing copolymer" is described later.

The following describes on each component of the fluorine-containing copolymer composition of the present invention.

(Fluorine-Containing Copolymer (A))

According to the present application, fluorine-containing copolymer (A) is a copolymer containing a repeating unit based on fluoroolefin (to be referred also to as "fluoroolefin (a1)" hereinafter) and a repeating unit based on a monomer having no fluorine atom. The fluoroolefin (a1) contained in the fluorine-containing copolymer (A) may be only one species or two species or more.

According to the fluorine-containing copolymer (A) of the present invention, it is preferred that at least a part of the monomer having no fluorine atom is a monomer having a crosslinkable group (to be referred also to as "monomer (a2) having crosslinkable group" hereinafter). It is preferred that the fluorine-containing copolymer (A) is a copolymer obtained by using, as monomers, one or more species of the fluoroolefin (a1) and one or more species of the monomer (a2) having crosslinkable group.

Also, in addition to the repeating unit based on the fluoroolefin (a1) and a repeating unit based on the monomer (a2) having crosslinkable group, the fluorine-containing copolymer (A) of the present invention may contain a repeating unit based on a monomer having no fluorine atom and no crosslinkable group (to be referred also to as "monomer (a3)" hereinafter).

Each of the monomers which constitute the above-mentioned repeating units of the fluorine-containing copolymer (A) of the present invention is described in the following.

(1) Fluoroolefin (a1)

The fluoroolefin (a1) of the present invention is a compound in which a part or all of the hydrogen atoms binding to the carbon atom of olefin hydrocarbon are substituted with fluorine atoms. The fluoroolefin (a1) may have a halogen atom other than the fluorine atom such as chlorine and the like. The number of fluorine atoms contained in the fluoroolefin (a1) is preferably 2 or more, more preferably from 2 to 6, and further preferably 3 or 4. When the number of fluorine atoms is 2 or more, weather resistance of the obtained coating film becomes sufficient in case that the fluorine-containing copolymer composition of the present invention is used as paint.

Examples of the fluoroolefin (a1) include tetrafluoroethylene, chlorotrifluoroethylene, vinylidene fluoride, and hexafluoropropylene. Tetrafluoroethylene and chlorotrifluoroethylene are particularly preferable.

An amount of the repeating unit based on the fluoroolefin (a1) contained in the fluorine-containing copolymer (A) of the present invention is preferably from 30% by mol to 70% by mol, more preferably from 40% by mol to 60% by mol, and further preferably from 45% by mol to 55% by mol, of all the repeating units in the fluorine-containing polymer (A). Composition of the fluorine-containing copolymer (A) becomes the above range when an amount of the fluoroolefin (a1) to be used in the polymerization is set to preferably from 30% by mol to 70% by mol, more preferably from 40% by mol to 60% by mol, and further preferably from 45% by mol to 55% by mol, of all the monomers to be used in the polymerization.

Weather resistance becomes proper when the above-mentioned fluoroolefin (a1) is the lower limit value or more, whereas solubility in the solvent and diluent becomes proper when it is the upper limit value or less.

(2) Monomer (a2) Having Crosslinkable Group

The monomer (a2) having crosslinkable group according to the present invention is a monomer having a crosslinkable group having no fluorine atom and is a monomer having a double bond capable of copolymerizing with the above fluoroolefin (a1).

Illustratively, it is preferred that the monomer (a2) having crosslinkable group is a monomer having a structure of the following formula 1.

[Chem. 1]

$$CH_2=CX(CH_2)_n\text{-}Q\text{-}R\text{—}Y \tag{1}$$

In the formula 1, X is hydrogen atom or methyl group, n is 0 or 1, Q is oxygen atom, a group represented by —C(=O)O—, or a group represented by —OC(=O)—, R is an alkylene group having from 2 to 20 carbon atoms, which may have a branched structure or a ring structure, and Y is a crosslinkable group.

Preferred examples of the crosslinkable group include a functional group having active hydrogen such as hydroxyl group, carboxyl group, and amino group; and a hydrolysable silyl group such as an alkoxysilyl group.

As the monomer (a2) having crosslinkable group, a compound of the formula 1 where Y is hydroxyl group, carboxyl group or amino group is preferred, and of which a compound where Y is hydroxyl group is more preferred. In the monomer (a2) having crosslinkable group, R in the formula 1 is preferably an alkylene group having from 2 to 20 carbon atoms, which may have a branched structure or a ring structure, and of which a linear alkylene group is more preferred. The number of carbon atoms of said alkylene group is preferably from 1 to 10, more preferably from 1 to 6, and further preferably from 2 to 4. In the monomer (a2) having crosslinkable group, Q in the formula 1 is preferably oxygen atom.

In this connection, the number of carbon atoms in the case of having a branched structure means the number of carbon atoms including the branched part and the main backbone. The number of carbon atoms in the case of having a ring structure means the number of carbon atoms including the ring part and the main backbone.

Preferable example of the monomer (a2) having crosslinkable group include a monomer having a hydroxyl group as the crosslinkable group, such as hydroxyalkyl vinyl ethers, hydroxyalkylcarboxylic acid vinyl esters, hydroxyalkylcarboxylic acid allyl ethers, hydroxyalkyl allyl esters, and (meth)acrylic acid hydroxyalkyl esters; a monomer having a carboxyl group as the crosslinkable group, such as unsaturated carboxylic acids, saturated polyvalent carboxylic acid monovinyl esters, unsaturated carboxylic acids or intramolecular acid anhydrides thereof, and unsaturated carboxylic acid monoesters; and a monomer having an amino group as the crosslinkable group, such as aminoalkyl vinyl ethers represented by $CH_2=CH\text{—}O\text{—}(CH_2)_x\text{—}NH_2$ (x=1 to 10), aminoalkyl allyl ethers represented by $CH_2=CHCH_2\text{—}O\text{—}(CH_2)_y\text{—}NH_2$ (y=1 to 10), aminoalkylcarboxylic acid vinyl esters represented by $CH_2=CH\text{—}O\text{—}CO(CH_2)_s\text{—}NH_2$ (s=1 to 10), aminoalkylcarboxylic acid allyl esters represented by $CH_2=CHCH_2\text{—}O\text{—}CO(CH_2)_t\text{—}NH_2$ (t=1 to 10), aminomethylstyrene, vinylamine, acrylamide, vinylacetamide, and vinylformamide.

Preferable illustrative examples of the monomer (a2) having crosslinkable group include hydroxyalkyl vinyl ethers such as 2-hydroxyethyl vinyl ether (HEVE), hydroxymethyl vinyl ether (HMVE), and 4-hydroxybutyl vinyl ether (HBVE); hydroxyalkyl allyl ethers such as hydroxyethyl allyl ethers; and (meth)acrylic acid hydroxyalkyl esters such as hydroxyethyl (meth)acrylate. Hydroxyalkyl vinyl ethers are more preferred because of the excellent copolymerizing ability and proper weather resistance of the coating film formed when the fluorine-containing copolymer composition of the present invention is used as paint. Particularly, 4-hydroxybutyl vinyl ether (HBVE) is preferred.

An amount of the repeating unit based on the monomer (a2) having crosslinkable group contained in the fluorine-containing copolymer (A) of the present invention is preferably from 5% by mol to 40% by mol and more preferably from 8% by mol to 35% by mol, of all the repeating units in the fluorine-containing copolymer (A). Composition of the fluorine-containing copolymer (A) becomes the above-mentioned range when an amount of the monomer (a2) having crosslinkable group to be used in the polymerization of the fluorine-containing copolymer (A) according to the present invention, is set to preferably from 5% by mol to 40% by mol and more preferably from 8% by mol to 35% by mol, of all the monomers to be used in the polymerization.

When the amount of the monomer (a2) having crosslinkable group contained is the lower limit value or more, a sufficient amount of the crosslinkable group for obtaining a coating film having high hardness in the case of using the fluorine-containing copolymer composition of the present application as paint, is introduced into the copolymer. Whereas, when the amount of the monomer (a2) having crosslinkable group contained is the upper limit value or less, a low viscosity sufficient as a solution of the fluorine-containing copolymer composition can be maintained even in the case of a high solid content type.

(3) Monomer (a3) Having No Fluorine Atom and No Crosslinkable Group

In addition to the above fluoroolefin (a1) and the above monomer (a2) having crosslinkable group, the fluorine-containing copolymer (A) of the present invention may be a copolymer obtained by using another monomer (a3) having no fluorine atom and no crosslinkable group for the purpose of controlling hardness and flexibility of the fluorine-containing copolymer composition of the present application. The monomer (a3) is a monomer having a double bond capable of copolymerizing with the above fluoroolefin (a1) and the above monomer (a2) having crosslinkable group.

Illustratively, it is preferred that the monomer (a3) is a monomer having a structure of the following formula 2.

[Chem. 2]

$$CH_2=CX(CH_2)_n\text{-}Q\text{-}R\text{—}H \tag{2}$$

In the formula 2, X is hydrogen atom or methyl group, n is 0 or 1, Q is oxygen atom, a group represented by —C(=O)O— or a group represented by —OC(=O)—, and R is an alkylene group having from 2 to 20 carbon atoms, which may have a branched structure or a ring structure.

In this connection, the number of carbon atoms in the case of having a branched structure means the number of carbon atoms including the branched part and the main backbone. The number of carbon atoms in the case of having a ring structure means the number of carbon atoms including the ring part and the main backbone.

Preferred examples of the monomer (a3) include alkyl vinyl ethers, alkyl carboxylic acid vinyl esters, alkyl allyl ethers, alkyl carboxylic acid allyl esters, and (meth)acrylic acid esters. In this connection, the description of (meth) acrylic acid means both acrylic acid and methacrylic acid.

As illustrative examples of the monomer (a3), ethyl vinyl ether (EVE), cyclohexyl vinyl ether (CHVE), 2-ethylhexyl vinyl ether (2EHVE) and the like are preferable.

Particularly, when the monomer (a3) contains cyclohexyl vinyl ether (CHVE), it is preferred because the obtained copolymer shows high rigidity and is soluble in solvents and particularly because its application is easy and a hard coating film is obtained particularly when applied to paint.

An amount of the repeating unit based on the monomer (a3) contained in the fluorine-containing copolymer (A) according to the present invention is preferably from 0% by mol to 45% by mol, more preferably from 3% by mol to 35% by mol, and further preferably from 5% by mol to 30% by mol, of all the repeating units. Composition of the fluorine-containing copolymer (A) becomes the above range when an amount of the monomer (a3) to be used in the polymerization of the fluorine-containing copolymer (A) according to the present invention is set to preferably from 0% by mol to 45% by mol, more preferably from 3% by mol to 35% by mol, and further preferably from 5% by mol to 30% by mol, of the all monomers to be used in the polymerization.

When the monomer (a3) is contained in the fluorine-containing copolymer (A), hardness and flexibility of the coating film obtained in the case of using the fluorine-containing copolymer composition of the present application as paint can be appropriately controlled. When the amount of the monomer (a3) is the upper limit value or less, a sufficient amount of the crosslinkable group for obtaining a coating film having proper weather resistance and high hardness is introduced into the copolymer.

In this connection, an amount of the repeating units based on the monomer (a2) having crosslinkable group and the monomer (a3) contained in the fluorine-containing copolymer (A) according to the present invention is preferably from 30% by mol to 70% by mol, more preferably from 40% by mol to 60% by mol, and further preferably from 45% by mol to 55% by mol, of all the repeating units in the fluorine-containing copolymer (A). Composition of the fluorine-containing copolymer (A) becomes the above range when total amount of the monomer (a2) having crosslinkable group and monomer (a3) to be used in the polymerization of the fluorine-containing copolymer (A) according to the present invention is set to preferably from 30% by mol to 70% by mol, more preferably from 40% by mol to 60% by mol, and further preferably from 45% by mol to 55% by mol, of all the monomers to be used in the polymerization.

Though number average molecular weight of the fluorine-containing copolymer (A) is not particularly limited, it is preferred that the number average molecular weight (Mn) of the fluorine-containing copolymer (A) is from 3,000 to 9,000. When Mn is 3,000 or more, weather resistance of the obtained coating film is excellent in the case of using the fluorine-containing copolymer composition of the present invention as paint, whereas when Mn is 9,000 or less, it is preferred because sufficient solubility can be realized and low viscosity can therefore be realized even when concentration of the fluorine-containing copolymer (A) in the fluorine-containing copolymer composition is high.

(Organic Solvent)

The fluorine-containing copolymer composition of the present invention contains an organic solvent. The organic solvent is not particularly limited with the proviso that the solvent can realize the amount of potassium carbonate contained of from 5 ppm to 80 ppm, on the $K_2O$ basis, based on the fluorine-containing copolymer (A).

The organic solvent is preferably at least one organic solvent selected from the group consisting of aromatic hydrocarbon solvents, ketone solvents, ether ester solvents, ester solvents and weak solvents.

The ether ester solvent is a compound having both of ether bond and ester bond in the molecule. The weak solvent is a solvent classified into the type III organic solvent of Japan's Industrial Safety and Health Law.

As the aromatic hydrocarbon solvent, toluene, xylene, ethylbenzene, aromatic petroleum naphtha, tetralin, SOLVESSO #100 (registered trade mark, Exon Mobile Chemical Company), and SOLVESSO #150 (registered trade mark, Exon Mobile Chemical Company) are preferred, and xylene, toluene and ethylbenzene are more preferred.

As the ketone solvent, acetone, methyl ethyl ketone (MEK), methyl amyl ketone (MAK), methyl isobutyl ketone, ethyl isobutyl ketone, diisobutyl ketone, cyclohexanone, and isophorone are preferred.

As the ether ester solvent, ethyl 3-ethoxypropionate (EEP), propylene glycol monomethyl ether acetate and methoxybutyl acetate are preferred.

The weak solvent is a solvent consisting of one or more substances selected from the group consisting of gasoline, coal tar naphtha (including solvent naphtha), petroleum ether, petroleum naphtha, petroleum benzine, turpentine oil, and mineral spirit (including mineral thinner, petroleum spirit, white spirit, and mineral terpene).

As the weak solvent, mineral spirit (including mineral thinner, petroleum spirit, white spirit, and mineral terpene) is preferred because its flash point is room temperature or higher.

As the ester solvent, methyl acetate, ethyl acetate, n-propyl acetate, isobutyl acetate, and t-butyl acetate are preferred.

Of these, an aromatic hydrocarbon solvent is more preferred as the organic solvent, and xylene, toluene and ethylbenzene are preferred as the aromatic hydrocarbon solvent. Further preferably, a solvent containing from 10% by mass to 100% by mass of ethylbenzene and from 0% by mass to 90% by mass of xylene is preferred, and the ethylbenzene content is more preferably from 10% by mass to 80% by mass.

In addition, from the viewpoint of environmental load reduction, a solvent corresponding to the PRTR (Pollutant Release and Transfer Register) law and HAPs (Hazardous Air Pollutants) regulation, that is, an organic solvent that does not contain aromatic, and weak solvent are also employed as the organic solvent.

Illustratively, use can be made of a ketone solvent or ether ester solvent which does not come under the PRTR law and HAPs regulation, or a paraffin solvent or naphthene solvent as the weak solvent.

The organic solvent may consist of only one species of solvent or may be a mixed solvent of two or more species.

As for the organic solvent, it is preferred that a polymerization solvent used in the solution polymerization of the fluorine-containing copolymer (A), that is, a polymerization solvent containing an alcohol solvent having from 1 to 6 carbon atoms and a solvent other than said alcohol solvent having from 1 to 6 carbon atoms, is directly used as the organic solvent to be contained in the fluorine-containing copolymer composition. However, for the purpose of adjusting the amount of potassium carbonate contained to a level of from 5 ppm to 80 ppm, on the $K_2O$ basis, based on the fluorine-containing copolymer (A), it is important that an amount of the alcohol solvent having from 1 to 6 carbon atoms contained in the polymerization solvent is lowered to a level of from 0% by mass to 0.03% by mass in the potassium carbonate lowering step of the production method of the fluorine-containing copolymer composition.

It is possible to distil a part of the polymerization solvent away or not distil away and newly add a solvent different from the polymerization solvent, or to distil entire portion of the same away and completely replace it by another solvent(s), with the proviso that the amount of potassium carbonate contained can be adjusted to a level of from 5 ppm to 80 ppm, on the $K_2O$ basis, based on the fluorine-containing copolymer.

Incidentally, the polymerization solvent containing the alcohol solvent having from 1 to 6 carbon atoms and a solvent other than said alcohol solvent having from 1 to 6 carbon atoms to be used in the solution polymerization of fluorine-containing copolymer (A) is described later.

As for the amount of the organic solvent contained in the fluorine-containing copolymer composition, it is preferred that mass ratio (fluorine-containing copolymer (A)/organic solvent) of the fluorine-containing copolymer (A) with the organic solvent is from 1/9 to 9/1. That is, it is preferred that the amount of the organic solvent contained in the fluorine-containing copolymer composition is from about 10% by mass to about 90% by mass based on the fluorine-containing copolymer composition. It is preferred that solid content in the fluorine-containing copolymer composition is from about 10% by mass to about 90% by mass because solubility of the copolymer in the organic solvent is good when the content is about 10% by mass or more and aftertreatment performance is proper when it is about 90% by mass or less.

<Production Method of the Fluorine-Containing Copolymer Composition of the Present Invention>

The production method of the fluorine-containing copolymer composition of the present invention includes the following steps (1) to (3).

(1) Polymerization step: A step of subjecting a monomer mixture comprising a fluoroolefin and a monomer having no fluorine atom to copolymerization, in the presence of a radical polymerization initiator, potassium carbonate, and a polymerization solvent containing an alcohol solvent having from 1 to 6 carbon atoms and a solvent other than the alcohol solvent having from 1 to 6 carbon atoms, under a condition that at least a part of the potassium carbonate is dissolved in the polymerization solvent, to thereby obtain a solution of the fluorine-containing copolymer (A).

(2) Potassium carbonate precipitation step: A step of removing the above alcohol solvent having from 1 to 6 carbon atoms from the solution of the fluorine-containing copolymer (A) and thereby lowering an amount of the alcohol solvent having from 1 to 6 carbon atoms contained, to a level of from 0% by mass to 0.03% by mass based on the polymerization solvent, to precipitate potassium carbonate in the solution.

(3) Potassium carbonate lowering step: A step of filtering the solution of the fluorine-containing copolymer (A) obtained by the potassium carbonate precipitation step to remove undissolved potassium carbonate and thereby lowering an amount of the potassium carbonate contained in the solution to a level of from 5 ppm to 80 ppm, on the $K_2O$ basis, based on the fluorine-containing copolymer (A).

The following describes each step in detail.

(1) Polymerization Step

The polymerization step of the production method of the fluorine-containing copolymer composition of the present invention is a step of subjecting a monomer mixture comprising a fluoroolefin and a monomer having no fluorine atom to copolymerization, in the presence of a radical polymerization initiator, potassium carbonate, and a polymerization solvent containing an alcohol solvent having from 1 to 6 carbon atoms and a solvent other than the alcohol solvent having from 1 to 6 carbon atoms, under a condition that at least a part of the potassium carbonate is dissolved in the polymerization solvent, to thereby obtain a solution of the fluorine-containing copolymer (A).

Examples of the monomer mixture in the polymerization step (1) include a mixture containing one or more of the above fluoroolefin (a1) and, in addition, as needed, one or more of the above monomer (a2) having crosslinkable group and monomer (a3) having no fluorine atom and no crosslinkable group.

As for the potassium carbonate to be used in the polymerization step, those having a size of from 100 μm to 1000 μm in average particle diameter are preferred, and those of from 100 μm to 600 μm are more preferably used. When the average particle diameter is 100 μm or more, the removal by filtration becomes easy. Whereas when it is 1000 μm or less, the copolymerization reaction progresses smoothly because of the large surface area per unit.

In this connection, the average particle diameter means weight average particle diameter measured by the "Test method for sieving of chemical products" of JIS K0069 (1992).

As for the potassium carbonate having an average particle diameter within the above range, a commercial item may be appropriately selected and used, and specifically, there may be mentioned the Potassium Carbonate (Special Grade) manufactured by Kanto Chemical Co., Inc., and the like.

It is preferred that mass ratio (potassium carbonate/total monomers in the monomer mixture) of the potassium carbonate with total monomers in the monomer mixture in the polymerization step is from 0.005/1 to 0.013//1. More preferred is from 0.008/1 to 0.012/1. By setting the mass ratio of potassium carbonate with total monomers in the monomer mixture to 0.005/1 or more, smooth progress of the copolymerization reaction can be achieved, and by setting the mass ratio of the potassium carbonate with total monomers in the monomer mixture to 0.013/1 or less, polymerization stability can be ensured and coloring of the fluorine-containing copolymer composition can also be inhibited.

In this connection, the polymerization solvent in the polymerization step is not particularly limited with the proviso that it contains an alcohol solvent having from 1 to 6 carbon atoms, and a conventionally known solvent which can be used in polymerization can be used in addition to the alcohol solvent having f from 1 to 6 carbon atoms. However, since special treatments such as solvent substitution are not necessary, it is preferred that the same organic solvent contained in the fluorine-containing copolymer composition of the present invention is used as the polymerization solvent in the polymerization step and the composition obtained after the potassium carbonate lowering step of the above (3) is directly used as the fluorine-containing copolymer composition of the present invention. However, as described in the foregoing, for the purpose of adjusting the amount of potassium carbonate contained to a level of from 5 ppm to 80 ppm, on the $K_2O$ basis, based on the fluorine-containing copolymer (A), it is important that the amount of the alcohol solvent having from 1 to 6 carbon atoms contained in the polymerization solvent is set to a level of from 0% by mass to 0.03% by mass in the potassium carbonate lowering step of the production method of fluorine-containing copolymer composition.

Alternatively, at any stage of the production steps, it is possible to distil a part of the polymerization solvent used in the polymerization step away or not distil away and newly add a solvent different from the polymerization solvent used in the polymerization step, or distil entire portion of the polymerization solvent used in the polymerization step away and completely replace it by a solvent different from the polymerization solvent used in the polymerization step. As the "solvent different from the polymerization solvent used in the polymerization step" to be used in this case, it is important that it is an organic solvent which can be contained in the fluorine-containing copolymer composition and the amount of potassium carbonate contained can be controlled to a level of from 5 ppm to 80 ppm, on the $K_2O$ basis, based on the fluorine-containing copolymer.

As for the solvent other than an alcohol solvent having from 1 to 6 carbon atoms in the polymerization solvent to be used in the polymerization step, there may be mentioned one species or more selected from the group consisting of aromatic hydrocarbon solvents, alcohol solvents other than the alcohol solvent having from 1 to 6 carbon atoms, ketone solvents, ether ester system solvents, ester solvents, and weak solvents. As the aromatic hydrocarbon solvents, ketone solvents, ether ester solvents, ester solvents, and weak solvents, there may be mentioned those which were exemplified as the above organic solvents contained in the fluorine-containing copolymer composition.

Examples of the alcohol solvents other than the alcohol solvent having from 1 to 6 carbon atoms, include octyl alcohol and dodecyl alcohol.

Of these, an aromatic hydrocarbon solvent, an ether ester solvent and an alcohol solvent other than the alcohol solvent having from 1 to 6 carbon atoms are more preferred as the solvent other than the alcohol solvent having from 1 to 6 carbon atoms. Further preferred is an aromatic hydrocarbon solvent, and xylene, toluene and ethylbenzene are particularly preferred.

According to the present application, as the polymerization solvent to be used in the polymerization step, a polymerization solvent containing a solvent other than the alcohol solvent having from 1 to 6 carbon atoms together with the above-mentioned alcohol solvent having from 1 to 6 carbon atoms is used.

Examples of the alcohol solvent having from 1 to 6 carbon atoms in the polymerization solvent, include methanol, ethanol, n-propanol, i-propanol, tert-butanol, pentanol, and hexanol. Particularly preferred is ethanol because solubility of potassium carbonate therein is good.

As for the ratio of the alcohol solvent having from 1 to 6 carbon atoms in the polymerization solvent in the polymerization step, the alcohol solvent having from 1 to 6 carbon atoms is preferably contained from 10% by mass to 95% by mass, and more preferably contained from 20% by mass to 90% by mass, based on the polymerization solvent.

When the polymerization solvent contains the alcohol solvent having from 1 to 6 carbon atoms within the above range, solubility of potassium carbonate for the polymerization solvent becomes high at the time of the copolymerization reaction. Potassium carbonate not only improves storage stability of the fluorine-containing copolymer composition but also has the effect to improve polymerization stability by presenting in the polymerization system during the solution polymerization.

Further, it is preferable to use a solvent containing from 10% by mass to 100% by mass of ethylbenzene and from 0% by mass to 90% by mass of xylene, as the solvent other than the alcohol solvent having from 1 to 6 carbon atoms. That is, it is preferred that the polymerization solvent to be used in the polymerization step contains a solvent containing from 10% by mass to 100% by mass of ethylbenzene and from 0% by mass to 90% by mass of xylene, as a solvent other than an alcohol solvent having from 1 to 6 carbon atoms, and the alcohol solvent having from 1 to 6 carbon atoms.

According to the present invention, when the ratio of ethylbenzene in the solvent other than the alcohol solvent having from 1 to 6 carbon atoms is 10% by mass or more, it is preferred because solubility of potassium carbonate to the solvent is lowered and solubility of potassium carbonate in the fluorine-containing copolymer composition is lowered.

As the polymerization solvent to be used in the polymerization step, most preferred is a polymerization solvent containing: from 60% by mass to 90% by mass of a solvent other than the alcohol solvent having from 1 to 6 carbon atoms, containing from 10% by mass to 100% by mass of ethylbenzene and from 0% by mass to 90% by mass of xylene; and from 10% by mass to 40% by mass of the alcohol solvent having from 1 to 6 carbon atoms.

It is preferred to allow the above monomer mixture to undergo copolymerization by solution polymerization in the presence of a radical polymerization initiator, potassium carbonate and the polymerization solvent containing the above alcohol solvent having from 1 to 6 carbon atoms and a solvent other than said alcohol solvent, under such a condition that at least a part of the potassium carbonate is dissolved. In addition, a chain transfer agent is added as needed.

In this connection, the "condition that at least a part of the potassium carbonate is dissolved" means a condition in which a part of potassium carbonate is dissolved in the solvent but at least a part thereof may be dispersed (including floating or precipitating) therein undissolved state.

As the radial polymerization initiator to be used, a conventionally known initiator can be used, and examples thereof include azo initiators such as 2,2'-azobisisobutyronitrile, 2,2'-azobiscyclohexane carbonatenitrile, 2,2'-azobis(2,4-dimethylvaleronitrile), and 2,2'-azobis(2-methylbutyronitrile); and peroxide initiators such as cyclohexanone peroxide and the like ketone peroxides, tert-butyl hydroperoxide and the like hydroperoxides, benzoyl peroxide and the like diacyl peroxide; di-tert-butyl peroxide and the like dialkyl peroxides, 2,2-di-(tert-butylperoxy)butane and the like peroxyketals, tert-butyl peroxypivalate (PBPV) and the like alkyl peresters, and diisopropyl peroxydicarbonate and the like percarbonates.

In addition, when there is a necessity to control number average molecular weight (Mn) of the fluorine-containing copolymer (A), a conventionally known chain transfer agent may be added as needed.

The copolymerization is preferably carried out in a solution polymerization by, specifically, any one of the following methods.

(i) A method in which all the monomers, a polymerization solvent containing an alcohol solvent having from 1 to 6 carbon atoms and a solvent other than said alcohol solvent, potassium carbonate and a radical polymerization initiator are charged in a batch and allowed to undergo the polymerization. The charging order can be appropriately set.

(ii) A method in which, into a reactor charged with a polymerization solvent containing an alcohol solvent having from 1 to 6 carbon atoms and a solvent other than said alcohol solvent, a fluoroolefin (a1) and potassium carbonate, monomers other than the fluoroolefin (a1) and a radical polymerization initiator are added continuously or intermittently. The monomers other than fluoroolefin (a1) and radical polymerization initiator may be mixed with the polymerization solvent and added together, and the charging order can be appropriately set.

(iii) A method in which, into a reactor charged with a polymerization solvent containing an alcohol solvent having from 1 to 6 carbon atoms and a solvent other than said alcohol solvent and potassium carbonate, all the monomers and a radical polymerization initiator are respectively added continuously or intermittently. All the monomers and radical polymerization initiator may be mixed with the polymerization solvent and added together, and the charging order can be appropriately set.

(iv) A method in which, into a reactor charged with a polymerization solvent containing an alcohol solvent having from 1 to 6 carbon atoms and a solvent other than said alcohol solvent and potassium carbonate and further with a portion of a fluoroolefin (a1) and/or monomers other than the fluoroolefin (a1), the remaining portion of the fluoroolefin (a1) and/or monomers other than fluoroolefin (a1) and a radical polymerization initiator are added continuously or intermittently. Remaining portion of fluoroolefin (a1) and/or monomers other than fluoroolefin (a1) and radical polymerization initiator may be mixed with the polymerization solvent and added together, and the charging order can be appropriately set.

The polymerization reaction is preferably carried out under conditions of 65±10° C. for from 6 hours to 36 hours. The polymerization temperature may be appropriately set in accordance with the degradation initiation temperature and half-life of the initiator to be used. Termination of the polymerization reaction is preferably carried out after cooling by a polymerization inhibitor such as hydroquinone monomethyl ether.

(2) Potassium Carbonate Precipitation Step

After the above polymerization step (1), a step of removing the above alcohol solvent having from 1 to 6 carbon atoms, thereby lowering it to a level of preferably from 0% by mass to 0.03% by mass based on the polymerization solvent to precipitate potassium carbonate in the solution, is carried out.

When the alcohol solvent having from 1 to 6 carbon atoms is contained in the polymerization solvent in a large amount, it is difficult to remove the potassium carbonate dissolving in the total solvent due to high solubility of potassium carbonate in the polymerization solvent, even when the subsequent potassium carbonate lowering step (3) is carried out. In order to control the amount of potassium carbonate contained to a level of from 5 ppm to 80 ppm, on the $K_2O$ basis, based on the fluorine-containing copolymer (A), it is preferred to effect precipitation of the dissolved potassium carbonate by removing the alcohol solvent having from 1 to 6 carbon atoms from the polymerization solvent and then remove the insoluble matter by carrying out filtration.

As a means for controlling the alcohol solvent having from 1 to 6 carbon atoms to a content range of from 0% by mass to 0.03% by mass based on the polymerization solvent, there may be mentioned a method in which concentration is carried out by heating under a reduced pressure using a vacuum distillation device, and the like.

When amount of solvent is too reduced in removing the alcohol solvent, it is preferred to appropriately add a solvent other than the alcohol solvent having from 1 to 6 carbon atoms.

It is also preferred to carry out a preliminary filtration before removing the alcohol solvent having from 1 to 6 carbon atoms. The preliminary filtration is carried out for the purpose of roughly separating by filtration the potassium carbonate or its modified products and the like dispersed (including floating or precipitating one) as solid matter in the solution of the fluorine-containing copolymer (A). In this connection, when the preliminary filtration is not carried out, these may be removed in the following potassium carbonate lowering step (3).

The preliminary filtration method is not particular limited, but for example, this is carried out by transferring the obtained reaction liquid into a pressure filter equipped with a filter paper for high viscosity fluid use (e.g., No. 63) and separating potassium carbonate and the like by filtration under a pressure of from 0.05 MPa to 0.5 MPa.

After the alcohol removal, an appropriate solvent can be supplementary added for the purpose of adjusting the solid concentration. As the solvent to be used in this case, there may be mentioned a solvent other than the alcohol solvent having from 1 to 6 carbon atoms used in the above polymerization step, and an organic solvent contained in the fluorine-containing copolymer composition. The solid concentration is preferably from 10% by mass to 90% by mass in view of the solubility of the copolymer composition and workability at the time of aftertreatment.

(3) Potassium Carbonate Lowering Step

The potassium carbonate lowering step of the production method of the fluorine-containing copolymer composition of the present invention is a step of filtering the alcohol solvent-removed solution of the fluorine-containing copolymer (A) obtained in the potassium carbonate precipitation step (2) to remove undissolved potassium carbonate, to thereby obtain a fluorine-containing copolymer composition in which the amount of potassium carbonate contained in the solution (composition), is adjusted to a level of from 5 ppm to 80 ppm, on the $K_2O$ basis, based on the fluorine-containing copolymer (A).

By this potassium carbonate lowering step, a composition having an amount of potassium carbonate contained in the composition of from 5 ppm to 80 ppm, on the $K_2O$ basis, based on the fluorine-containing copolymer (A) can be prepared.

The solvent contained in the solution of the fluorine-containing copolymer (A) in the potassium carbonate lowering step is preferably identical to the polymerization solvent used in the polymerization step, but according to the necessity, other solvent may be added thereto or it may be replaced by other solvent prior to the filtration step. However, the amount of the alcohol solvent having from 1 to 6 carbon atoms contained in the solvent is from 0% by mass to 0.03% by mass.

The filtration method is no particularly limited, but in the present invention, a filtration using diatomaceous earth may be mentioned. As the diatomaceous earth, those having an intermediate particle size of from 25 μm to 40 μm may be mentioned, and its amount used is preferably from 0.05 g/cm² to 0.10 g/cm² based on the filtration area.

Regarding a relationship between intermediate particle size and the amount used of diatomaceous earth, there is a tendency that concentration of potassium carbonate is lowered as the intermediate particle size becomes small, and concentration of potassium carbonate is lowered when the amount used is increased. Therefore, the diatomaceous earth may be appropriately selected so that the intermediate particle size thereof is from 25 μm to 40 μm and its amount used is within the range of from 0.05 g/cm² to 0.10 g/cm² based on the filtration area.

Specifically, the filtration is carried out by transferring the liquid into a pressure filter equipped with a No. 63 filter paper for high viscosity fluid use, carrying out its filtration using the above diatomaceous earth under a pressure condition of from 0.01 MPa to 0.05 MPa, and carrying out circulation filtration until haze cannot detected visually in appearance of the filtrate.

In this connection, thickness of the cake layer of diatomaceous earth formed on the filter paper of the pressure filter is preferably from 1.5 mm to 2.5 mm. In order to control thickness of the cake layer at from 1.5 mm to 2.5 mm, the filtration may be carried out under the above conditions.

The intermediate particle size is a particle diameter when % by mass is integrated starting from the smaller particle diameter and becomes 50% by mass. As the diatomaceous earth having intermediate particle size of within the above-mentioned range, a commercial item may be appropriately selected and used.

In this connection, though there is a description "remove undissolved potassium carbonate" in the present invention, minute potassium carbonate which is not dissolved but dispersed may remain in the obtained fluorine-containing copolymer composition depending on the intermediate particle size and amount used of the diatomaceous earth in the filtration. It is enough to achieve the state that potassium carbonate including such dispersed potassium carbonate, is contained in an amount of from 5 ppm to 80 ppm, on the $K_2O$ basis, based on the fluorine-containing copolymer.

Prior to the above-mentioned potassium carbonate lowering step (3), additives can be added for the fluorine-containing copolymer composition as needed.

<Use of the Fluorine-Containing Copolymer Composition>

The fluorine-containing copolymer composition of the present invention can be suitably used as clear paint. When the fluorine-containing copolymer composition of the present invention is used as paint, it preferably contains further a paint blending component such as a curing agent, and a resin other than the fluorine-containing copolymer (A). Two or more of these blending components may be used concomitantly.

When the fluorine-containing copolymer composition of the present invention is used as paint, it may be one-component type paint or two-component type paint. In the case of two-component type, it is preferred that the curing agent is mixed just before its use.

(Curing Agent)

As the curing agent, a curing agent crosslinkable with the crosslinkable group possessed by the monomer (a2) having crosslinkable group in the fluorine-containing copolymer (A) is preferred.

When the crosslinkable group possessed by the monomer (a2) having crosslinkable group is hydroxyl group, preferred curing agent is a curing agent for paint use such as a normal temperature-setting type isocyanate curing agent, a thermosetting type block isocyanate curing agent, and a melamine curing agent.

Preferred examples of the normal temperature-setting type isocyanate curing agent include non-yellowing isocyanates such as hexamethylene diisocyanate and isophorone diisocyanate.

Preferred examples of the thermosetting type block isocyanate curing agent include those in which isocyanate group of the isocyanate curing agent has been blocked with caprolactam, isophorone, β-diketone, and the like.

Preferred examples of the melamine curing agent include melamine etherificated with a lower alcohol, such as butylated melamine, and epoxy-modified melamine.

An amount of the curing agent contained in the paint according to the present invention is preferably from 1 part by mass to 100 parts by mass and more preferably from 1 part by mass to 50 parts by mass, based on 100 parts by mass of the fluorine-containing copolymer (A) in the paint.

When the curing agent is 1 part by mass or more, solvent resistance of the obtained coating film is excellent and its hardness is sufficient, whereas when the curing agent is 100 parts by mass or less, processability becomes excellent and also impact resistance becomes excellent.

(Resins Other than Fluorine-Containing Copolymer (A))

As a resin other than the fluorine-containing copolymer (A), a conventionally known resin to be blended in paint can be appropriately used.

For example, for the purpose of improving drying property of coating film, CAB (cellulose acetate butyrate), NC (nitrocellulose) or the like may be blended. In addition, for the purpose of improving gloss and hardness of coating film and applicability of paint, a paint resin such as a polymer consisting of acrylic acid or an ester thereof, polyester or the like may be blended.

(Other Components)

In addition to the above, conventionally known components to be blended in paint, such as a silane coupling agent, an ultraviolet ray absorbent, a curing accelerator, a light stabilizer, a coloring agent, delustering agent or the like, may be blended as additives as needed.

Examples of the ultraviolet ray absorbent include HALS (hindered amine).

Examples of the coloring agent include an inorganic pigment having good light resistance such as carbon black and titanium oxide; an organic pigment such as Phthalocyanine Blue, Phthalocyanine Green, Quinacridone Red, Indanthrene Orange, and Isoindolinone Yellow; and a dyestuff.

As the method for carrying out coating using the fluorine-containing copolymer composition of the present invention as paint, any given method such as spray coating, air spray coating, brushing, dipping method, roll coater, or flow coater can be employed.

As the material of articles to be coated, there may be mentioned an inorganic substance such as concrete, natural stone, and glass; a metal such as iron, stainless steel, aluminum, copper, brass, and titanium; and an organic substance such as plastics, rubber, adhesive, and wood.

In addition, it is also suited for the coating of an organo-mineral composite material such as fiber-reinforced plastic (FRP), resin-reinforced concrete, and fiber-reinforced concrete.

As the articles to be coated, there may be mentioned an instrument for transportation use such as automobiles, trains, and airplanes; a member for civil engineering such as bridge members and steel towers; an industrial machine part such as waterproof material sheets, tanks, and pipes; a architectural member such as building facings, doors, window and gate members, monuments, and poles; a road member such as median strips of roads, guardrails, and sound insulating walls; communication machine parts; electric and electronic parts; and surface sheets and back sheets for solar battery modules.

EXAMPLES

The following describes the present invention in detail based on Examples and Comparative Examples. Incidentally, part and % are shown by mass basis unless otherwise noted.

<Measuring Methods>

(Measurement of Potassium Concentration)

Measurement of potassium concentration was carried out using an atomic absorption spectrometry. Specifically, a sample was diluted with an organic solvent and potassium ion was extracted into water, and the potassium ion was measured by flame photometer. Its quantitative determination was carried out by preparing a calibration curve using a potassium chloride aqueous solution of the standard liquid for atomic absorption spectrometry.

(Measurement of Molecular Weight)

Number average molecular weight of the fluorine-containing copolymer (A) was measured by gel permeation chromatography (GPC) using polystyrene as the standard substance.

(Measurement of Alcohol Concentration)

The amount of the alcohol solvent having from 1 to 6 carbon atoms contained based on the polymerization solvent was verified by GC analysis.

<Preparation of Solvent Other than the Alcohol Solvent Having from 1 to 6 Carbon Atoms, Used in the Polymerization Solvent>

Preparation of mixed xylene was carried out using p-xylene having a purity of 98% or more and ethylbenzene having a purity of 98% or more.

Mixed xylene A*1: ethylbenzene concentration of 50% by mass
Mixed xylene B: ethylbenzene concentration of 10% by mass
Mixed xylene C: ethylbenzene concentration of 80% by mass
Mixed xylene D: ethylbenzene concentration of 5% by mass
*1: As the mixed xylene A, an industrial xylene consisting of 50% by mass of o-, m- and p-xylene and 50% by mass of ethylbenzene was used.

<Preparation of Fluorine-Containing Copolymer Compositions>

Example 1

To a 2500 ml capacity stainless steel pressure reactor equipped with a stirrer were placed 587 g of the mixed xylene A prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth a (intermediate particle size 30.1 μm) in an amount of 0.06 g/cm² based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa, to obtain a fluorine-containing copolymer composition (A-1). Thickness of the cake layer of diatomaceous earth formed on the filter paper in the pressure filter was 1.9 mm.

Concentration of the potassium carbonate in the thus obtained fluorine-containing copolymer composition (A-1) was 42 ppm on the $K_2O$ basis based on the copolymer (fluorine-containing copolymer (A-1)) mass.

The amount of the monomers presenting in the composition was 0.6% by mass based on the copolymer (fluorine-containing copolymer (A)) mass. In addition, composition of this copolymer analyzed based on $^{13}C$ NMR spectrum was 50.0/14.7/25.5/9.8 as CTFE/CHVE/EVE/HBVE in molar ratio.

Example 2

To a 2500 ml capacity stainless steel pressure reactor equipped with a stirrer were placed 668 g of the mixed xylene A prepared in the above, 188 g of ethanol, 195 g of 2-ethylhexyl vinyl ether (2EHVE), 87 g of 4-hydroxybutyl vinyl ether (HBVE), 272 g of cyclohexyl vinyl ether (CHVE), 10 g of potassium carbonate, and 3.5 g of tert-butyl peroxypivalate (PBPV), and dissolved oxygen in the liquid was removed by pressure purging with nitrogen and degassing.

Next, to this was introduced 503 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth a (intermediate particle size 30.1 μm) in an amount of 0.06 g/cm² based on the filtration area, mixed with stifling, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (B-1). Thickness of the cake layer of diatomaceous earth formed on the filter paper in the pressure filter was 1.9 mm.

Concentration of the potassium carbonate in the thus obtained fluorine-containing copolymer composition (B-1) was 27 ppm on the $K_2O$ basis based on the copolymer (fluorine-containing copolymer (A)) mass.

The amount of the monomers presenting in the composition was 0.8% by mass based on the copolymer (fluorine-containing copolymer (A)) mass. In addition, composition of this copolymer analyzed based on $^{13}C$ NMR spectrum was 50.5/26.3/14.5/8.7 as CTFE/CHVE/2EHVE/HBVE in molar ratio.

Example 3

To a 2500 ml capacity stainless steel pressure reactor equipped with a stirrer were placed 674 g of the mixed xylene A prepared in the above, 190 g of ethanol, 308 g of ethyl vinyl ether (EVE), 124 g of 4-hydroxybutyl vinyl ether (HBVE), 13 g of potassium carbonate, and 3.5 g of tert-butyl peroxypivalate (PBPV), and dissolved oxygen in the liquid was removed by pressure purging with nitrogen and degassing.

Next, to this was introduced 622 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth a (intermediate particle size 30.1 μm) in an amount of 0.06 g/cm$^2$ based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa, to obtain a fluorine-containing copolymer composition (C-1). Thickness of the cake layer of diatomaceous earth formed on the filter paper in the pressure filter was 1.9 mm.

Concentration of potassium carbonate in the thus obtained fluorine-containing copolymer composition (C-1) was measured by atomic absorption spectrometry and was found 5 ppm on the K$_2$O basis based on the copolymer (fluorine-containing copolymer (A)) mass.

The amount of the monomers presenting in the solution was 0.5% by mass based on the copolymer (fluorine-containing copolymer (A)) mass. In addition, composition of this copolymer analyzed based on $^{13}$C NMR spectrum was 50.0/40.3/9.7 as CTFE/EVE/HBVE in molar ratio.

Example 4

To a 2500 ml capacity stainless steel pressure reactor equipped with a stirrer were placed 587 g of the mixed xylene B prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened. The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene B, thereby obtaining a concentration-adjusted liquid.

Next, to the concentration-adjusted liquid was added diatomaceous earth a (intermediate particle size of 30.1 μm) in an amount of 0.06 g/cm$^2$ based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-2). Thickness of the cake layer of diatomaceous earth formed on the filter paper in the pressure filter was 1.9 mm.

Concentration of the potassium carbonate in the thus obtained fluorine-containing copolymer composition (A-2) was 50 ppm on the K$_2$O basis based on the copolymer (fluorine-containing copolymer (A)) mass.

The amount of the monomers presenting in the composition was 0.6% by mass based on the copolymer (fluorine-containing copolymer (A)) mass. In addition, composition of this copolymer analyzed based on $^{13}$C NMR spectrum was 50.0/14.7/25.5/9.8 as CTFE/CHVE/EVE/HBVE in molar ratio.

Example 5

To a 2500 ml capacity stainless steel pressure reactor equipped with a stirrer were placed 587 g of the mixed xylene C prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto. Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene C, thereby obtaining a concentration-adjusted liquid.

Next, to the concentration-adjusted liquid was added diatomaceous earth a (intermediate particle size of 30.1 μm) in an amount of 0.06 g/cm² based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-3). Thickness of the cake layer of diatomaceous earth formed on the filter paper in the pressure filter was 1.9 mm.

Concentration of the potassium carbonate in the thus obtained fluorine-containing copolymer composition (A-3) was 64 ppm on the $K_2O$ basis based on the copolymer (fluorine-containing copolymer (A)) mass.

The amount of the monomers presenting in the solution was 0.6% by mass based on the copolymer (fluorine-containing copolymer (A)) mass. In addition, composition of this copolymer analyzed based on $^{13}C$ NMR spectrum was 50.0/14.7/25.5/9.8 as CTFE/CHVE/EVE/HBVE in molar ratio.

Example 6

To a 2500 ml capacity stainless steel pressure reactor equipped with a stirrer were placed 587 g of ethylbenzene, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding ethylbenzene, thereby obtaining a concentration-adjusted liquid.

Next, to the concentration-adjusted liquid was added diatomaceous earth a (intermediate particle size of 30.1 win) in an amount of 0.06 g/cm² based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-9). Thickness of the cake layer of diatomaceous earth formed on the filter paper in the pressure filter was 1.9 mm.

Concentration of the potassium carbonate in the thus obtained fluorine-containing copolymer composition (A-9) was 62 ppm on the $K_2O$ basis based on the copolymer (fluorine-containing copolymer (A)) mass.

The amount of the monomers presenting in the composition was 0.6% by mass based on the copolymer (fluorine-containing copolymer (A)) mass. In addition, composition of this copolymer analyzed based on $^{13}C$ NMR spectrum was 50.0/14.7/25.5/9.8 as CTFE/CHVE/EVE/HBVE in molar ratio.

Comparative Example 1

To a 2500 ml capacity stainless steel pressure reactor equipped with a stirrer were placed 587 g of the mixed xylene A prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa and then 0.1 g of hydroquinone monomethyl ether (HQMME) was added thereto. Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth b (intermediate particle size of 19.2 μm) in an amount of 0.06 g/cm² based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-4). Thickness of the cake layer of diatomaceous earth formed on the filter paper in the pressure filter was 2.0 mm.

Concentration of the potassium carbonate in the thus obtained fluorine-containing copolymer composition (A-4) was 2 ppm on the $K_2O$ basis based on the copolymer (fluorine-containing copolymer (A)) mass.

The amount of the monomers presenting in the solution was 0.6% by mass based on the copolymer (fluorine-containing copolymer (A)) mass. In addition, composition of this copolymer analyzed based on $^{13}C$ NMR spectrum was 50.0/14.7/25.5/9.8 as CTFE/CHVE/EVE/HBVE in molar ratio.

Comparative Example 2

To a 2500 ml capacity stainless steel pressure reactor equipped with a stirrer were placed 587 g of the mixed xylene A prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth c (intermediate particle size 46.5 μm) in an amount of 0.06 g/cm² based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-5). Thickness of the cake layer of diatomaceous earth formed on the filter paper in the pressure filter was 1.8 mm.

Concentration of the potassium carbonate in the thus obtained fluorine-containing copolymer composition (A-5) was 133 ppm on the $K_2O$ basis based on the copolymer (fluorine-containing copolymer (A-1)) mass.

The amount of the monomers presenting in the solution was 0.6% by mass based on the copolymer (fluorine-containing copolymer (A)) mass. In addition, composition of this copolymer analyzed based on $^{13}C$ NMR spectrum was 50.0/14.7/25.5/9.8 as CTFE/CHVE/EVE/HBVE in molar ratio.

Comparative Example 3

To a 2500 ml capacity stainless steel pressure reactor equipped with a stirrer were placed 587 g of the mixed xylene A prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth a (intermediate particle size of 30.1 μm) in an amount of 0.12 g/cm² based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-6). Thickness of the cake layer of diatomaceous earth formed on the filter paper in the pressure filter was 3.8 mm.

Concentration of the potassium carbonate in the thus obtained fluorine-containing copolymer composition (A-6) was 3 ppm on the $K_2O$ basis based on the copolymer (fluorine-containing copolymer (A)) mass.

Amount of the monomers presenting in the solution was 0.6% by mass based on the copolymer (fluorine-containing copolymer (A)) mass. In addition, composition of this copolymer analyzed based on $^{13}C$ NMR spectrum was 50.0/14.7/25.5/9.8 as CTFE/CHVE/EVE/HBVE in molar ratio.

Comparative Example 4

To a 2500 ml capacity stainless steel pressure reactor equipped with a stirrer were placed 587 g of the mixed xylene A prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until the amount of ethanol therein became 0.03% by mass or less based on the polymerization solvent. Subsequently, solid concentration in the concentrated liquid was measured and then the solid concentration was adjusted to 60% by mass by newly adding the mixed xylene A, thereby obtaining a concentration-adjusted liquid.

Next, to the concentration-adjusted liquid was added diatomaceous earth a (intermediate particle size of 30.1 µm) in an amount of 0.03 g/cm$^2$ based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-7). Thickness of the cake layer of diatomaceous earth formed on the filter paper in the pressure filter was 0.9 mm.

Concentration of the potassium carbonate in the thus obtained fluorine-containing copolymer composition (A-7) was 158 ppm on the K$_2$O basis based on the copolymer (fluorine-containing copolymer (A)) mass.

The amount of the monomers presenting in the solution was 0.6% by mass based on the copolymer (fluorine-containing copolymer (A)) mass. In addition, composition of this copolymer analyzed based on $^{13}$C NMR spectrum was 50.0/14.7/25.5/9.8 as CTFE/CHVE/EVE/HBVE in molar ratio.

Comparative Example 5

To a 2500 ml capacity stainless steel pressure reactor equipped with a stirrer were placed 587 g of the mixed xylene D prepared in the above, 168 g of ethanol, 206 g of ethyl vinyl ether (EVE), 129 g of 4-hydroxybutyl vinyl ether (HBVE), 208 g of cyclohexyl vinyl ether (CHVE), 11 g of potassium carbonate, and 3.5 g of tert-butyl peroxypivalate (PBPV), and dissolved oxygen in the liquid was removed by pressure purging with nitrogen and degassing.

Next, to this was introduced 660 g of chlorotrifluoroethylene (CTFE), temperature was gradually risen and the reaction was continued while keeping the temperature at 65° C. After 12 hours, the reaction was stopped by cooling the reactor with water. This reaction liquid (solution of fluorine-containing copolymer (A)) was cooled to room temperature and then the unreacted monomers were purged and the reactor was opened.

The thus obtained reaction liquid (solution of fluorine-containing copolymer (A)) was transferred to a pressure filter equipped with No. 63 filter paper for high viscosity fluid use, potassium carbonate was separated by filtration under a pressure of 0.05 MPa (preliminary filtration) and then 0.1 g of hydroquinone monomethyl ether (HQMME) was added thereto.

Next, under a reduced pressure with heating, the reaction liquid (solution of fluorine-containing copolymer (A)) was concentrated using a vacuum distillation apparatus until amount of ethanol therein became 0.03% by mass or less based on the polymerization solvent. Subsequently, solid concentration in the concentrated liquid was measured and then the solid concentration was adjusted to 60% by mass by newly adding the mixed xylene D, thereby obtaining a concentration-adjusted liquid.

Next, to the concentration-adjusted liquid was added diatomaceous earth a (intermediate particle size of 30.1 µm) in an amount of 0.06 g/cm$^2$ based on the filtration area, mixed with stirring, and then the liquid was transferred to a pressure filter equipped with No. 63 filter paper for high viscosity fluid use, and the diatomaceous earth was removed by filtration by filtering twice under a pressure of 0.2 MPa to obtain a fluorine-containing copolymer composition (A-8). Thickness of the cake layer of diatomaceous earth formed on the filter paper in the pressure filter was 1.9 mm.

Concentration of potassium carbonate in the thus obtained fluorine-containing copolymer composition (A-8) was measured by atomic absorption spectrometry and was found 84 ppm on the K$_2$O basis based on the copolymer (fluorine-containing copolymer (A)) mass.

The amount of the monomers presenting in the solution was 0.6% by mass based on the copolymer (fluorine-containing copolymer (A)) mass. In addition, composition of this copolymer analyzed based on $^{13}$C NMR spectrum was 50.0/14.7/25.5/9.8 as CTFE/CHVE/EVE/HBVE in molar ratio.

<Evaluation of Obtained Fluorine-Containing Copolymer Compositions>

Evaluation of storage stability and appearance of the fluorine-containing copolymer compositions of Examples 1 to 6 and Comparative Examples 1 to 5 obtained in the above was carried out in the following manner, with the results shown in Table 1. In this connection, blending amount of each fluorine-containing copolymer composition, diatomaceous earth used in the filtration step, and the like are also shown in Table 1.

(Evaluation of Storage Stability)

The obtained fluorine-containing copolymer compositions were stored under a condition of 70° C. for 14 days, and then the solutions were visually observed and the presence or absence of gelation was evaluated.

As the evaluation criteria, absence of gelation was regarded as A, and presence of gelation as B.

(Evaluation of Appearance)

The obtained fluorine-containing copolymer compositions were observed visually to evaluate the degree of haze.

TABLE 1

| | | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|
| Blending (parts) | Monomers | CTFE | 660 | 503 | 622 | 660 | 660 | 660 | 660 | 660 | 660 | 660 | 660 |
| | | EVE | 206 | — | 308 | 206 | 206 | 206 | 206 | 206 | 206 | 206 | 206 |
| | | CHVE | 208 | 272 | — | 208 | 208 | 208 | 208 | 208 | 208 | 208 | 208 |
| | | HBVE | 129 | 87 | 124 | 129 | 129 | 129 | 129 | 129 | 129 | 129 | 129 |
| | | 2EHVE | — | 195 | — | — | — | — | — | — | — | — | — |
| | Potassium carbonate | | 11 | 10 | 13 | 11 | 11 | 11 | 11 | 11 | 11 | 11 | 11 |
| | Organic solvent | Ethanol | 168 | 188 | 190 | 168 | 168 | 168 | 168 | 168 | 168 | 168 | 168 |
| | | Mix. xylene A | 587 | 668 | 674 | — | — | — | 587 | 587 | 587 | 587 | — |
| | | Mix. xylene B | — | — | — | 587 | — | — | — | — | — | — | — |

TABLE 1-continued

|  |  |  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|
|  |  | Mix. xylene C | — | — | — | — | 587 | — | — | — | — | — | — |
|  |  | Mix. xylene D | — | — | — | — | — | — | — | — | — | — | 587 |
|  |  | Ethylbenzene | — | — | — | — | — | 587 | — | — | — | — | — |
|  | Initiator | PBPV | 3.5 | 3.5 | 3.5 | 3.5 | 3.5 | 3.5 | 3.5 | 3.5 | 3.5 | 3.5 | 3.5 |
|  | Terminator | HQMME | 0.1 | 0.1 | 0.1 | 0.1 | 0.1 | 0.1 | 0.1 | 0.1 | 0.1 | 0.1 | 0.1 |
| Blending (g/cm²) | Diatomaceous earth | Diatom. a | 0.06 | 0.06 | 0.06 | 0.06 | 0.06 | 0.06 | — | — | 0.12 | 0.03 | 0.06 |
|  |  | Diatom. b | — | — | — | — | — | — | 0.06 | — | — | — | — |
|  |  | Diatom. c | — | — | — | — | — | — | — | 0.06 | — | — | — |
| Fluorine-containing polymer composition |  |  | A-1 | B-1 | C-1 | A-2 | A-3 | A-9 | A-4 | A-5 | A-6 | A-7 | A-8 |
| Solid concentration (% by mass) |  |  | 60 | 60 | 60 | 60 | 60 | 60 | 60 | 60 | 60 | 60 | 60 |
| Potassium conc. (on the K₂O basis) [ppm] |  |  | 42 | 27 | 5 | 50 | 64 | 62 | 2 | 133 | 3 | 158 | 84 |
| Storage stability |  |  | A | A | A | A | A | A | B | A | B | A | A |
| Appearance |  |  | Clear | Clear | Clear | Clear | Clear | Clear | Clear | Haze | Clear | Haze | Haze |

While the present invention has been described in detail and with reference to the specific embodiments thereof, it is apparent to one skilled in the art that various modifications or changes can be made therein without departing the spirit and scope of the present invention.

This application is based on Japanese Patent Application No. 2011-120523 filed on May 30, 2011, the contents of which is incorporated herein by reference.

INDUSTRIAL APPLICABILITY

According to the present invention, a fluorine-containing copolymer composition having good storage stability in which generation of haze is inhibited, and a production method thereof can be provided.

The invention claimed is:

1. A fluorine-containing copolymer composition comprising:
   (A) a fluorine-containing copolymer having a repeating unit based on fluoroolefin and a repeating unit based on a monomer having no fluorine atom; potassium carbonate; and an organic solvent, wherein the potassium carbonate is present in an amount of from 5 ppm to 80 ppm, on a $K_2O$ basis, based on the fluorine-containing copolymer (A).

2. The fluorine-containing copolymer composition according to claim 1, wherein at least a part of the monomer having no fluorine atom is a monomer having a crosslinkable group.

3. The fluorine-containing copolymer composition according to claim 2, wherein the repeating unit based on fluoroolefin is from 30% by mol to 70% by mol, a repeating unit based on the monomer having a crosslinkable group is from 5% by mol to 40% by mol, and a repeating unit based on a monomer having no fluorine atom and no crosslinkable group is from 0 to 45% by mol, of all the repeating units in the fluorine-containing copolymer (A).

4. The fluorine-containing copolymer composition according to claim 1, wherein mass ratio (fluorine-containing copolymer (A)/organic solvent) is from 1/9 to 9/1.

5. A method for producing a fluorine-containing copolymer composition, comprising
   copolymerizing a monomer mixture comprising a fluoroolefin and a monomer having no fluorine atom, in the presence of a radical polymerization initiator, potassium carbonate, and a polymerization solvent containing an alcohol solvent having from 1 to 6 carbon atoms and a solvent other than the alcohol solvent having from 1 to 6 carbon atoms, under a condition such that at least a part of the potassium carbonate is dissolved in the polymerization solvent, to obtain a solution of a fluorine-containing copolymer (A);
   removing the alcohol solvent having from 1 to 6 carbon atoms from the solution of the fluorine-containing copolymer (A) and lowering an amount of said alcohol solvent having from 1 to 6 carbon atoms to a level of from 0% by mass to 0.03% by mass based on the polymerization solvent, to precipitate the potassium carbonate in the solution, and
   filtering the solution of the fluorine-containing copolymer (A) obtained by the potassium carbonate precipitation step to remove undissolved potassium carbonate and lowering the potassium carbonate in the solution to a level of from 5 ppm to 80 ppm, on a $K_2O$ basis, based on the fluorine-containing copolymer (A).

6. The method for producing a fluorine-containing copolymer composition according to claim 5, wherein mass ratio (potassium carbonate/total monomers in the monomer mixture) is from 0.005/1 to 0.013/1.

7. The method for producing a fluorine-containing copolymer composition according to claim 5, wherein an amount of the alcohol solvent having from 1 to 6 carbon atoms contained in the polymerization step is from 10% by mass to 95% by mass based on the polymerization solvent.

8. The method for producing a fluorine-containing copolymer composition according to claim 5, wherein the solvent other than the alcohol solvent having from 1 to 6 carbon atoms contains ethylbenzene.

9. The method for producing a fluorine-containing copolymer composition according to claim 8, wherein the solvent further comprises xylene, and the mass ratio (ethylbenzene/xylene) in the polymerization solvent is from 10/90 to 100/0.

10. The fluorine-containing copolymer composition according to claim 1, wherein the potassium carbonate is present in an amount of from 8 ppm to 65 ppm, on a $K_2O$ basis, based on the fluorine-containing copolymer (A).

11. The fluorine-containing copolymer composition according to claim 1, wherein the potassium carbonate is present in an amount of from 10 ppm to 55 ppm, on a $K_2O$ basis, based on the fluorine-containing copolymer (A).

12. The method for producing a fluorine-containing copolymer composition according to claim 5, comprising lowering the potassium carbonate in the solution to a level of from 8 ppm to 65 ppm, on a $K_2O$ basis, based on the fluorine-containing copolymer (A).

13. The method for producing a fluorine-containing copolymer composition according to claim 5, comprising lowering the potassium carbonate in the solution to a level of from 10 ppm to 55 ppm, on a $K_2O$ basis, based on the fluorine-containing copolymer (A).

14. The fluorine-containing copolymer composition according to claim 1, wherein the fluoroolefin is tetrafluoroethylene, chlorotrifluoroethylene, vinylidene fluoride, and hexafluoropropylene.

15. The fluorine-containing copolymer composition according to claim 14, wherein the fluorolefin is Tetrafluoroethylene and chlorotrifluoroethylene.

16. The method for producing a fluorine-containing copolymer composition according to claim 5, wherein the fluoroolefin is tetrafluoroethylene, chlorotrifluoroethylene, vinylidene fluoride, and hexafluoropropylene.

17. The method for producing a fluorine-containing copolymer composition according to claim 16, wherein the fluorolefin is Tetrafluoroethylene and chlorotrifluoroethylene.

* * * * *